INVENTOR.
HERBERT F. BARIFFI,
BY
Donald L. Royer
AGENT

Oct. 3, 1961   H. F. BARIFFI   3,002,527
HOT GAS RELIEF VALVE
Filed March 31, 1958   2 Sheets-Sheet 2
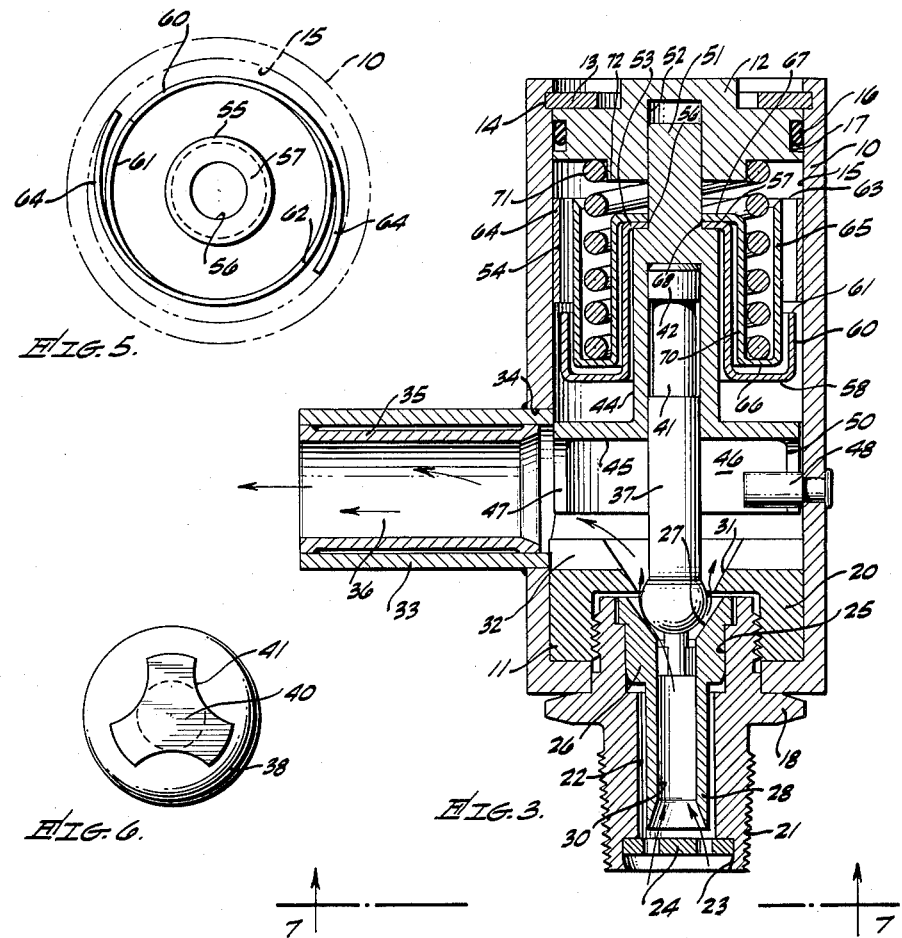
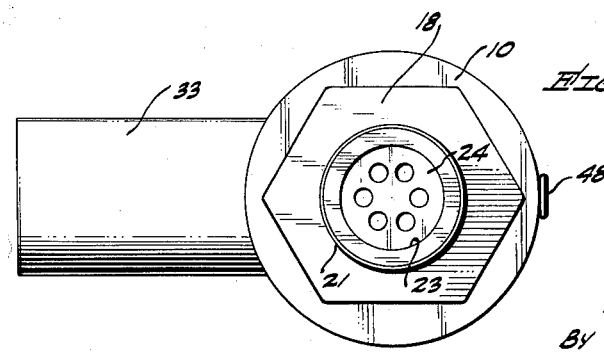
INVENTOR.
HERBERT F. BARIFFI,
BY
AGENT United States Patent Office 3,002,527
Patented Oct. 3, 1961

3,002,527
HOT GAS RELIEF VALVE
Herbert F. Bariffi, Los Angeles, Calif., assignor to Hughes Aircraft Company, Culver City, Calif., a corporation of Delaware
Filed Mar. 31, 1958, Ser. No. 725,438
2 Claims. (Cl. 137—514)

The present invention finds general utility in the field of relief valves and relates more particularly to hot gas relief valves.

While relief valves of various types have been known for a considerable period of time, prior use of valves of this type has extended to situations wherein only relatively low temperatures have been encountered and permissible space requirements have not been a problem. Prior similar devices have also employed fluid and friction type dampers and any necessity for insulation of such dampers, as in the fluid type of valve, could easily be made through use of large interconnecting structures and positive seals, whereby to prevent damage to such dampers through heating by hot gases or liquids passing through the valves. However, many contemporary requirements have necessitated the use of relatively small relief valves that are adapted to handle large quantities of hot gases and which must be positioned in areas of limited available space. Most valves of this type are biased, either open or closed, and many employ damping arrangements. When operating such valves in situations wherein temperatures may be as high as 2400° F., it is apparent that liquid type dampers would not be satisfactory due to the possibility of boiling and unduly expanding the liquid, and it is necessary to employ frictional type dampers. Additionally, serious problems have been encountered in connection with the use of differential pressure biased valves due to the necessity for pistons or diaphragms and the associated hot gas seals thereabout.

It has therefore been found that the most satisfactory type of relief valve employs a mechanical spring arrangement for biasing the valve toward an open or a closed position, with this type of arrangement being used in cooperation with a frictional type damper to prevent hammering of the valve on its valve seat. However, there are serious disadvantages in this arrangement. High temperatures in the area of biasing springs seriously change the spring rate characteristics thereof or may even cause distortion or loss of resiliency therein. This problem could be remedied through isolation of the spring members; however, this arrangement requires a larger housing structure, hot gas seals and the like, thus adding to the over-all weight, size and operating difficulty of the relief valve.

The present invention therefore provides a shielding arrangement for a valve member mechanical biasing means and a friction type damper in combination therewith, it having been found that through use of such an arrangement in the valve, temperatures of approximately 2400° F. raise the temperature in the spring area to only approximately 800° F. after a 30 second running period. This combination unit is used in cooperation with a hot gas deflector, whereby to produce an efficient, simple, easily operable and compact relief valve.

It is, accordingly, one object of the present invention to provide a hot gas relief valve employing a shielded biasing means in combination and cooperation with a frictional damping arrangement.

It is another object of the invention to provide a novel hot gas relief valve that is simple in construction, reliable and effective in operation and small in size.

Still another object of the invention is to provide a hot gas relief valve having inlet and outlet ports positioned normal to each other, together with a spring biasing means and heat shielding therefor so arranged and positioned as to prevent damage to the biasing means during short run operation of the valve.

Still another object of the invention is to provide a novel heat shield for use with the spring biasing arrangement of a relief valve, this heat shield being a unitary device with a combined function of providing damping for a valve member.

Other and further important objects of the invention will become apparent from the discloslures in the following detailed specification, appended claims and accompanying drawings, wherein:

FIG. 3 is a sectional view similar to FIG. 2 showing parts in different positions;

FIG. 5 is a top plan view of the combination shield and damper and showing the association of portions thereof with the inner surface of the valve body;

FIG. 6 is an enlarged detail bottom view of the valve member and guide employed with the present valve; and FIG. 7 is a bottom plan view of the present relief valve as taken substantially as indicated by line 7—7, FIG. 3.

Figure 1:
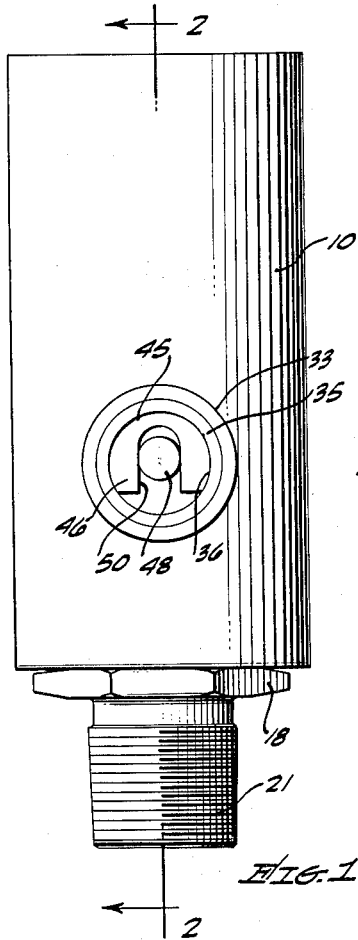
FIGURE 1 is a front elevational view of the present hot gas relief valve.

With reference to the drawings, the present hot gas relief valve includes an elongated, generally cylindrical body 10 having an integral inwardly directed flange 11 in one end thereof and a closure member 12 in another end thereof. The closure member 12 is retained in position by means of a snap ring 13 disposed in a groove 14 that is formed in an inner surface 15 of the body 10. Additionally, a sealing member 16, in the form of an O-ring, is disposed in a groove 17 in the periphery of the closure member 12 and cooperates with the inner surface 15 of the body 10.

A valve inlet structure is provided by means of a fitting 18 that threadably connects with a sleeve member 20 that is disposed within the body 10 and which engages an inner axial surface of the flange 11. The fitting 18 is threaded as at 21 for securing the valve to an adjacent structure. The fitting 18 is further provided with a bore 22, one end of which is enlarged as at 23, there being a perforated disc 24 disposed in the enlargement 23. Another end of the bore 22 is enlarged as at 25 for press fit reception of a valve seat member 26 that is in turn provided with a conical valve seat 27. The member 26 has an elongated tubular extension portion 28 that is disposed within the bore 22 and spaced radially inwardly from the wall of the bore 22. The valve seat member 26 and the extension 28 thereof has an elongated passageway 30 therethrough which communicates with a lower end of the valve seat 27. The sleeve member 20 is also further provided with a conical recess 31 in an upper surface thereof and lateral slots 32, the conical recess 31 being disposed in axial alignment with the seat 27 of the seat member 26 and is slightly larger in mean diameter than the seat 27, while the slots 32 serve as a means by which the sleeve member 20 may be held against rotation when attachment thereof is made to the fitting 18.

An outlet structure is also provided for the present valve, this outlet structure including a length of tubing 33 that is disposed in a suitable opening 34 that is formed laterally through the wall of the body 10, and secured therein as by any suitable means such as welding, or the like. The tubing member 33 is fitted with an internal sleeve 35 disposed partially in contact with the inner surface thereof and spaced from this surface along a substantial length to provide a heat shielding structure for the passage of hot gases through an outlet passageway 36 formed within the sleeve 35.

The valve hereof further includes a valve member having a stem portion 37, a free end of which supports a semicircular valve closure member 38. The closure member 38 has an extension portion 40 formed integrally therewith and depended downwardly therefrom, this extension portion 40 having side areas that are cut away as at 39, FIG. 6, to provide passage means thereabout, with outer peripheral edges of the portion 40 being disposed in slidable cooperation with the bore 30 in the extension 28 of the valve seat member 26. The extension portion 40 serves to guide the lower end of the valve closure member 38.

The upper end of the valve stem 37 has a reduced diameter portion 41 and a head portion 42 formed thereon. A section of the stem portion 37, as well as the reduced diameter portion 41 and head portion 42 are disposed in a bore 43 that is in turn formed in a projection 44 of a gas deflector 45. The gas deflector 45 comprises an annular disc-shaped element having a downwardly directed peripheral flange 46 that is in turn provided with an outlet opening 47. A pin 48 is disposed through the wall of the body 10 and slidably within a slot 50 in the flange 46, whereby to permit axial movement of the deflector within the body 10 and to prevent rotation of the deflector, thereby maintaining the outlet 47 in coextensive alignment with the outlet passageway 36 for the valve.

The projection 44 of the gas deflector 45 is further provided at its upper end with a stub shaft 51 that is axially slidably disposed in an elongated recess 52 formed in the closure member 12. This structure, including the shaft 51 and recess 52, serves to guide the upper end of the gas deflector 45 and in turn guide the upper end of the valve stem 37 through association of the head portion 42 with the bore 43 in the projection 44. A shoulder 53 is formed on an upper end of the projection 44 between peripheries of the projection 44 and the shaft 51.

Figure 2:
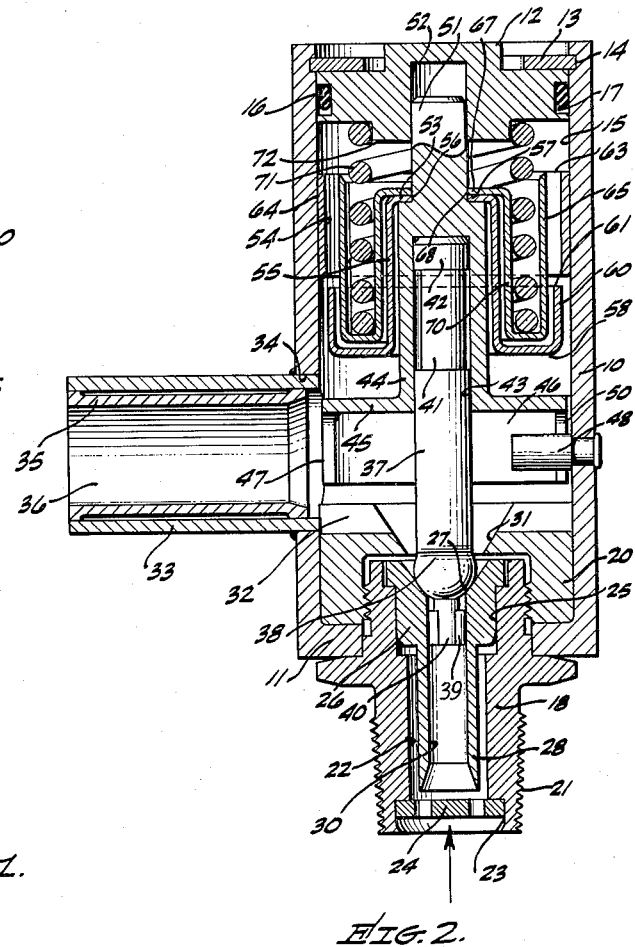
FIG. 2 is a vertical sectional view through the valve as taken substantially as indicated by line 2—2, FIG. 1.
Figure 4:
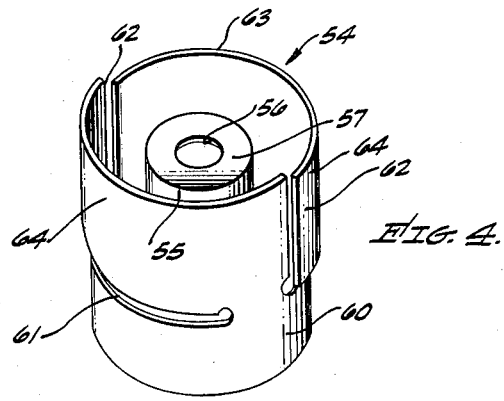
FIG. 4 is an isometric view showing the cup shaped combination heat shield and damper used with the valve of the present invention.

As shown in FIGS. 2, 4 and 5, a combination heat shield and vibration damping structure, indicated generally at 54, is disposed in operative association with the valve member and stem 37 thereof, in cooperation with the projection 44 of the heat shield 45 and the inner surface 15 of the body 10. As shown specifically in FIG. 4, the combination structure 54 is an integral element that may be formed from resilient sheet metal or the like and which includes a central stem portion 55 having an opening 56 in a transversely disposed wall 57 thereof. The wall 57 is adapted for disposition on the shoulder 53 carried by the upper end of the projection 44 with the opening 56 surrounding the shaft 51. The stem portion 55 extends downwardly and is joined by a radially outwardly disposed integral end portion 58 which in turn joins an axially directed integral outer portion 60. The outer portion 60 is spaced normally radially inwardly from the inner surface 15 of the body 10 and is circumferentially slotted as at 61 and further longitudinally slotted as at 62 from a free edge 63 to an intersection of one end of the circumferential slots 61, thus to define spring portions 64 that are bent for disposition spirally generally outwardly from the outer portion 60. Outer radial surfaces of the spring portions 64 are adapted for disposition in frictional sliding contact with the surface 15 of the body 10.

As shown in FIGS. 1 and 3, the combination structure 54 is retained in position relative to the projection 44 of the gas deflector 45 by means of a cup 65. The cup 65 is generally U-shaped in cross section and has a bottom wall 66 and an upper central wall 67. An opening 68 is provided in the wall 67 and adapted to surround the shaft 51, with the wall 67 being disposed in contact with an axially directed surface of the wall 57 of the combination structure 54. The walls 66 and 67 are interconnected by means of an axially directed integral portion 70 and a compression spring 71 is disposed between the bottom annular area of the cup 65 and the wall 66 thereof and the end closure member 12, there being a boss 72 disposed from the closure member 12, whereby centrally to retain the spring 71.

It may thus be seen that the spring 71 acts through the cup 65 and shoulder 53 on the projection 44, not only to retain the combination structure 54 in position but also to urge the valve closure member 38 toward contact with the valve seat 27.

In operation of the present valve, it may be seen that, upon establishment of a differential pressure across the valve closure member 38 sufficient to overcome the force of the spring 71, the valve components will be moved to the positions shown in FIG. 3, whereby to permit flow of hot gases through the passage 30, past the closure member 38, into the area of the gas deflector 45, outwardly through the opening 47 therein and thereafter outwardly through the outlet passageway 36. It is to be seen that the spring 71 is protected against intrusion of hot gases first by the deflector 45 and thereafter by the combination structure 54 and the cup 65. The combination structure 54 also serves, through the portions 64 thereof, to provide frictional damping of the valve closure member 38 and prevent hammering of this member against the valve seat 27. Thus, for low length runs of the present valve, adequate damping is provided together with heat protection for the spring 71 without the necessity for interconnecting structure, complex shafts and seals and/or separate units which not only add weight and size to the over-all structures but are also cumbersome and of little use where space requirements are a problem.

It may also be seen that other portions of the present valve structures are protected against the effects of hot gases by adequate spacing of components from other components and the provision of an air space therebetween. This situation is present in connection with the extension portion 28 and its association with the bore 22, as well as in the sleeve 35 and its association with the tubular member 33.

Having thus described the invention and the present embodiment thereof, it is desired to emphasize the fact that many modifications may be resorted to in a manner limited only by a just interpretation of the following claims.

I claim:

1. In a hot gas relief valve having a valve body, inlet and outlet ports disposed normal to each other, a valve member, a valve seat in said inlet port and cooperable with said valve member, a guide for said valve member and a spring bias between said valve and said body, the combination with said valve of a hot gas deflection, shielding and vibration damping apparatus comprising: a cup shaped shield disposed about said spring bias; and spirally expanded vibration damping portions formed in said wall of said shield and adapted for slidable engagement with an inner surface of said body.

2. In a hot gas relief valve having a valve body, inlet and outlet ports disposed normal to each other, a valve member, a valve seat in said inlet port and cooperable with said valve member, a guide for said valve member and a spring bias between said valve and said body, the combination with said valve of a hot gas deflection, shielding and vibration damping apparatus comprising: a cup shaped shield disposed about said spring bias; spirally expanded vibration damping portions formed in said wall of said shield and adapted for slidable engagement with an inner surface of said body; and a gas deflection member carried by a stem of said valve member and disposed between said inlet and outlet ports and adjacent said shield.

References Cited in the file of this patent

UNITED STATES PATENTS

| | | |
|---|---|---|
| Re. 12,945 | Wheeler | Apr. 20, 1909 |
| 1,003,412 | Ballard | Sept. 19, 1911 |
| 1,441,646 | Vaughan | Jan. 9, 1923 |
| 2,598,187 | Meyer | May 27, 1952 |
| 2,714,392 | Mercier | Aug. 2, 1955 |

FOREIGN PATENTS

| | | |
|---|---|---|
| 588,881 | Germany | Nov. 23, 1933 |